Nov. 9, 1943.  L. WINTERS  2,333,910
HOUSE TRAILER
Filed July 17, 1942  2 Sheets-Sheet 1
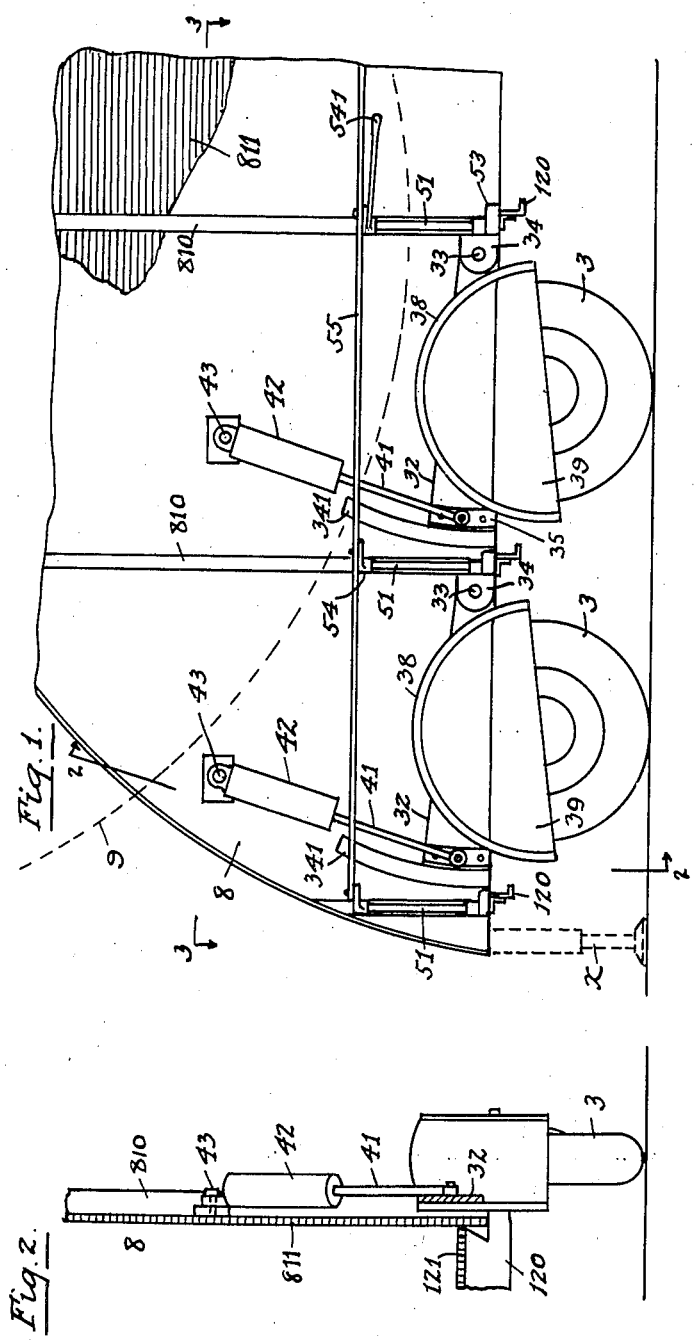
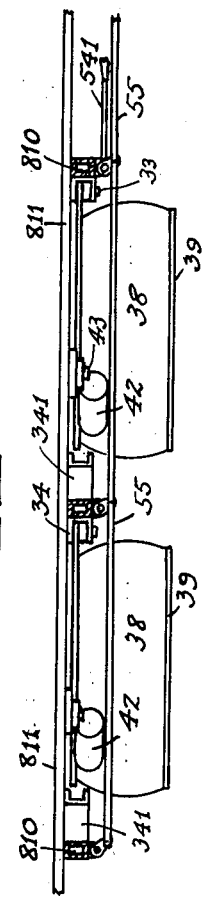
Inventor—
Leo Winters Nov. 9, 1943.    L. WINTERS    2,333,910
HOUSE TRAILER
Filed July 17, 1942    2 Sheets-Sheet 2
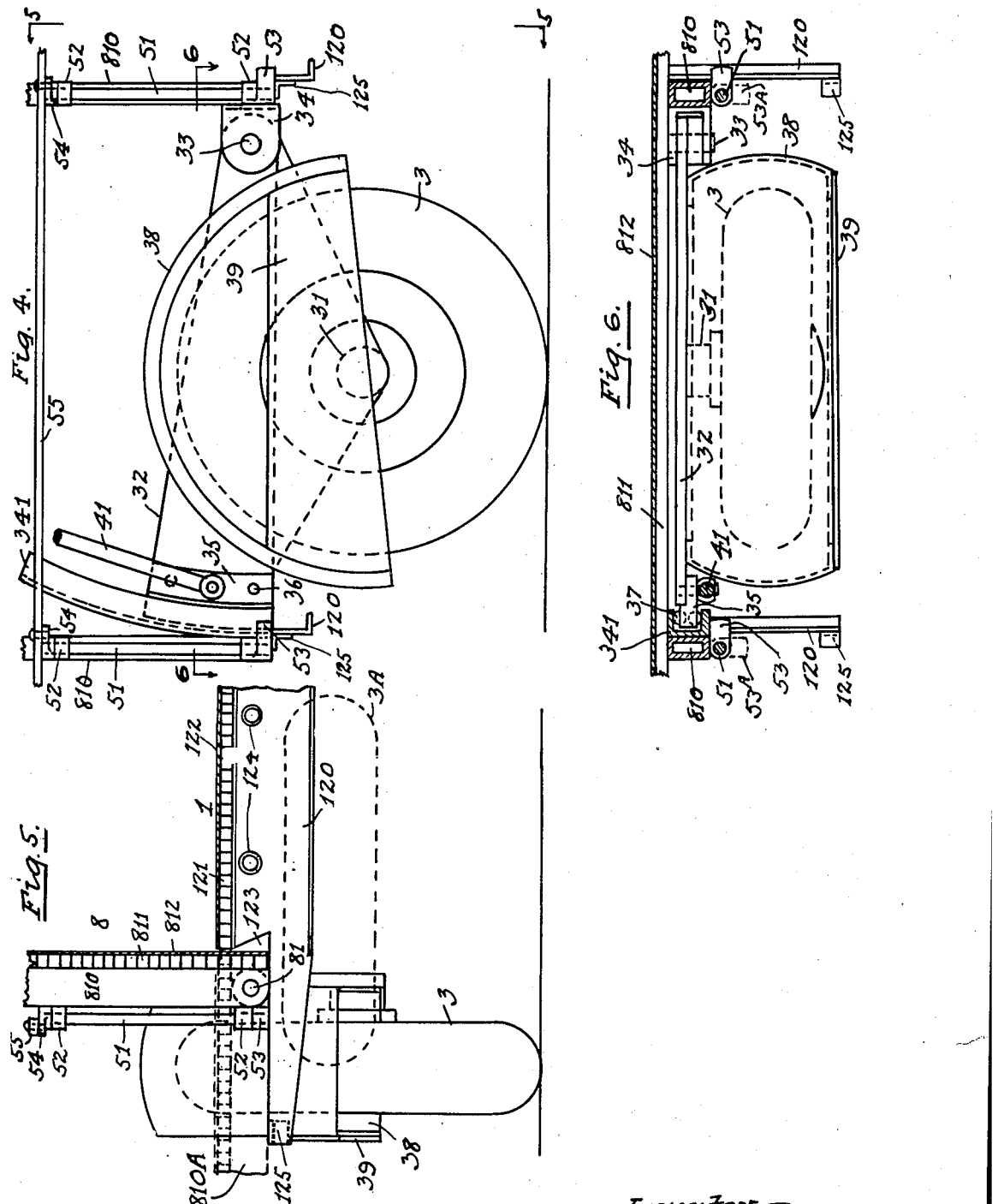
Inventor —
Leo Winters Patented Nov. 9, 1943

2,333,910

UNITED STATES PATENT OFFICE 2,333,910

HOUSE TRAILER

Leo Winters, Detroit, Mich.

Application July 17, 1942, Serial No. 451,369

3 Claims. (Cl. 280—40)

My invention relates to house trailers, and its principal object is to provide a trailer in which an individual suspension or so-called "knee action" is provided in connection with the supporting wheels, so that the twisting and racking strains to which such vehicles are ordinarily subjected are in my construction eliminated.

A further object of my said invention resides in the combination of the wheel suspension with a folding portion of the trailer, whereby the wheels and tires are held clear of the ground and protected from damage and robbery, as well as from weather conditions under which tires as ordinarily exposed are subject to dry rot and general deterioration.

With these and other objects in view, I will now describe a preferred embodiment of my invention as applied to a collapsible trailer of the type described in the specification of my prior Patent No. 2,181,844, issued November 28, 1939. In this description, reference will be had to the accompanying drawings, in which—

Figure 1 is a fragmentary side elevation of the rear portion of the trailer above referred to showing my improvements.

Figure 2 is a fragmentary transverse section taken approximately on line 2—2 of Figure 1.

Figure 3 is a fragmentary plan view of the same partly in section on line 3—3 of Figure 1.

Figure 4 is a fragmentary side elevation drawn to an enlarged scale illustrating one form of my improved wheel suspension.

Figure 5 is a fragmentary transverse section, taken on line 5—5 of Figure 4, drawn to an enlarged scale.

Figure 6 is a fragmentary plan view of the same, also on an enlarged scale, taken in section on line 6—6 of Figure 4, certain parts being shown in elevation.

Like characters designate corresponding parts throughout the several views.

In the collapsible trailer which forms the subject of my prior patent above referred to, there is shown a substantially rectangular main chamber having an approximately semi-circular annex on each side adapted to provide additional interior space within the trailer when opened up for use, while these annex portions are made to fold up when on the move in order to comply with the various States' regulations regarding highway travel.

For this latter purpose each annex comprises semi-circular roof and floor portions hinged to the main body or chassis and the enclosure is completed by the interposition of curved wall and door members which slide or fold into the main body when not in use.

In the present drawings the numeral 8 designates the annex floor member, hinged to the main floor or chassis 1 as at 81, and the numeral 9 the folding roof member, the latter being merely indicated in broken lines in Figure 1, since it is not essential to the instant invention. The floor member is, in fact, merely included as presenting one method of supporting my improved wheel suspension. The annex floor is made up of a series of rectangular tubes 810 spaced at intervals and having thereupon tubular floor members 811 arranged in close formation and covered by linoleum or other material 812. The main floor is made up from transverse members 120 carrying a similar superstructure 121 and linoleum covering 122. The members 810 are hinged at 81 to the adjacent transverse members 120, as shown more particularly in Figure 5 of the drawings. The members 120 are connected by longitudinal tubes 124 which extend throughout the length of the chassis, and the extreme ends of the said members are notched out as at 123 to provide a space for the annex floor members 810.

The numerals 3 designate the running wheels which in the present case, instead of being connected by transverse axles, are mounted on short, individual axles 31 which are secured by welding or otherwise to plates 32. Each of these plates, as shown more clearly in Figure 6 of the drawings, is carried at one end on a pivot pin 33, the said pin being held in brackets 34 connected to the adjacent floor members 810. Thus, the wheel is able to move in an arc about the pin 33 and at its free end the plate 32 is guided in an arcuate channel 341 secured to another of the members 810. In order to guide this end of the plate with minimum friction, there is provided a member 35 secured as by rivets 36 to the plate and having therein recesses adapted to receive anti-friction balls 37 which roll up and down within the channel 341. Attached to the plate 32 is also the fender 38 together with its detachable front plate 39 of conventional construction.

Angular movement of each wheel, due to irregularities of the road, is controlled by a rod 41 connected at one end to the member 35 while at the other end of this rod is a piston, not shown, slidably mounted in a cylinder 42, the said cylinder being pivoted to the member 8 as at 43. Within the cylinder is also a helical compression spring adapted to absorb the upward shocks due to movement of the wheels, while the piston operating within the cylinder 42 regulates the entire movement in a similar manner to many of the existing shock absorbers. It is not considered necessary here to describe further the shock absorber system, since it is well known in the art and may be replaced by any other system well adapted for this purpose.

It will be understood from the above description and from the accompanying drawings that when the annex floor members 810 are in the vertical or closed position, as shown in Figure 5, the wheels 3 will be adapted for travel upon the roadway, whereas when the floor members occupy a horizontal position, as shown at 810A in Figure 5, the wheels will be folded away under the chassis as indicated at 3A in Figure 5. In order to facilitate this folding movement, the chassis will be jacked up slightly so as to raise the wheels above the roadway, and the whole trailer, when in the open or occupied position, will be supported on jacks which may be of any conventional type indicated diagrammatically at x in the left hand portion of Figure 1. It is obvious that when the floor members are in the horizontal position, as shown at 810A, they will be so held by gravity, resting on the stops 125. When, however, the said members are raised to the vertical position, the trailer being closed, some means must be provided for so locking them. For this purpose, I may provide upon the members 810 a series of vertical shafts 51 carried in bearings 52 and having at their lower ends feet 53 adapted in one position to rest upon the transverse members 120 as shown in full lines, and alternatively, to swing clear of the said members as indicated at 53A in broken lines in Figure 6, so that the floor members can be moved into the horizontal position. Upon the upper ends of the shafts 51 are short levers 54 connected by a longitudinally extending operating rod 55, one of these levers, however, being formed as a handle as at 541, whereby all of the feet are operated simultaneously in one direction or the other, as required.

It will be observed from the foregoing description and by reference to the drawings that I have provided a simple and economical form of wheel suspension wherein each wheel responds individually to variations in the road surface and at the same time dispensing with the usual transverse axles which in ordinary trailers require the use of complicated and expensive underslinging of the chassis. In other words, the floor of the trailer can be brought nearer to the ground level, making it much more convenient for going in and out of the trailer when in use. It will be obvious, further, that, while in the present drawings the wheels and their suspension are carried upon the movable annex floor, my invention may be applied to a non-collapsible trailer by merely providing a swinging wheel-carrying element pivoted to the chassis in any ordinary manner, whereby it, together with the wheel assembly, can be rotated through ninety degrees.

While I have herein described a preferred embodiment of my invention, it will be readily understood by those skilled in the art to which the same pertains that various modifications in detail may be made to suit any particular or peculiar requirement without departing from the spirit of the invention as defined in the appended claims.

Having thus described my said invention, what I claim and desire to secure by Letters Patent of the United States is:

1. In a trailer including a chassis frame, a member hinged to said frame and adapted to swing on a horizontal axis through an angle of approximately 90 degrees, a longitudinally disposed plate pivoted to said member at one end and having its free end slidable in an arcuate guide fixed upon said member, an axle secured to said plate, a wheel mounted upon said axle, resilient shock-absorbing means adapted to control the movement of said plate about its pivot, and locking means for limiting the movement of said member about its hinge, said locking means comprising a lateral extension upon said frame, a rock-shaft upon said member, and a foot upon said rock-shaft adapted to engage said extension in one position and to be free of the same in another position.

2. In a trailer including a chassis frame, a member hinged to said frame and adapted to swing on a horizontal axis through an angle of approximately 90 degrees, a longitudinally disposed plate pivoted to said member at one end and having its free end slidable in an arcuate guide fixed upon said member, an axle secured to said plate, a wheel mounted upon said axle, resilient shock-absorbing means adapted to control the movement of said plate about its pivot, and locking means for limiting the movement of said member about its hinge, said locking means comprising a plurality of lateral extensions upon said frame, a plurality of rock-shafts upon said member, and a foot upon each rock-shaft adapted to engage an extension in one position and to be free of the same in another position.

3. In a trailer including a chassis frame, a member hinged to said frame and adapted to swing on a horizontal axis through an angle of approximately 90 degrees, a longitudinally disposed plate pivoted to said member at one end and having its free end slidable in an arcuate guide fixed upon said member, an axle secured to said plate, a wheel mounted upon said axle, resilient shock-absorbing means adapted to control the movement of said plate about its pivot, and locking means for limiting the movement of said member about its hinge, said locking means comprising a plurality of lateral extensions upon said frame, a plurality of rock-shafts upon said member, a foot upon each rock-shaft adapted to engage an extension in one position and to be free of the same in another position, and means for simultaneously operating said rock-shafts.

LEO WINTERS.